(12) United States Patent
Gariano et al.

(10) Patent No.: US 12,712,642 B2
(45) Date of Patent: Aug. 18, 2026

(54) QUANTUM OPTICAL COMMUNICATIONS RECEIVER

(71) Applicant: General Dynamics Mission Systems, Inc., Fairfax, VA (US)

(72) Inventors: John Anthony Gariano, Chandler, AZ (US); Todd M.W. Hodges, Mesa, AZ (US); Claudia Ann Gamble, Annapolis, MD (US); John M. Liebetreu, Scottsdale, AZ (US); Jerry Kwa-Wor Tong, Chandler, AZ (US); Juan C. Juarez, Ellicott City, MD (US)

(73) Assignee: General Dynamics Mission Systems, Inc., Fairfax, VA (US)

( * ) Notice: Subject to any disclaimer, the term of this patent is extended or adjusted under 35 U.S.C. 154(b) by 246 days.

(21) Appl. No.: 18/754,409

(22) Filed: Jun. 26, 2024

(65) Prior Publication Data

US 2026/0005771 A1 Jan. 1, 2026

(51) Int. Cl.

| | |
|---|---|
| ***H04B 10/70*** | (2013.01) |
| ***H01S 3/091*** | (2006.01) |
| ***H01S 3/108*** | (2006.01) |

(52) U.S. Cl.

CPC ........... *H04B 10/70* (2013.01); *H01S 3/0912* (2013.01); *H01S 3/1083* (2013.01)

(58) Field of Classification Search

None

See application file for complete search history.

(56) References Cited

U.S. PATENT DOCUMENTS

| | | | | |
|---|---|---|---|---|
| 6,982,822 | B2 * | 1/2006 | Teich | H04B 10/70 359/328 |
| 2013/0258253 | A1 * | 10/2013 | Fu | G02F 1/133528 438/30 |
| 2020/0044749 | A1 * | 2/2020 | Rauschenbach | G02F 1/395 |
| 2020/0409232 | A1 * | 12/2020 | Weiner | G06N 10/20 |
| 2021/0309469 | A1 * | 10/2021 | Lin | B65H 1/26 |
| 2023/0412280 | A1 * | 12/2023 | Moon | H04B 10/70 |
| 2024/0267130 | A1 * | 8/2024 | Hodges | H04B 10/70 |
| 2026/0005772 | A1 * | 1/2026 | Gariano | H04B 10/70 |

* cited by examiner

*Primary Examiner* — Robert E. Tallman

(74) *Attorney, Agent, or Firm* — Ingrassia Fisher & Lorenz, LLP

(57) ABSTRACT

The waveguide carrying a nonlinear crystal with reflective interface, a pump photon source and a circulator define an optical parametric amplifier which uses optical power from the pump photons to boost incoming signal and idler photons which carry the encoded signal. The nonlinear crystal performs optical parametric amplification upon the incoming optical signal in a quantum photonic process that generates additional signal and idler photons to thereby boost the intensity of the incoming signal. A photodetector is coupled for communication with the third port and operative to convert the reflected optical signal into an electrical signal defining the output of the communications receiver.

12 Claims, 1 Drawing Sheet

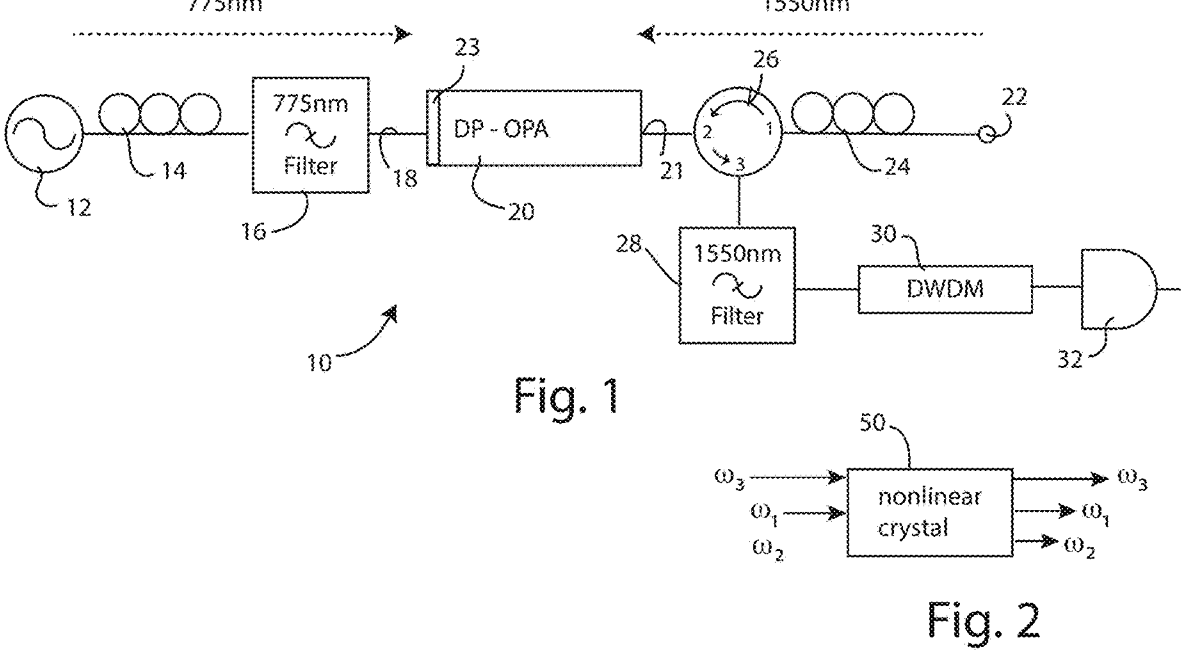
Fig. 1
Fig. 2
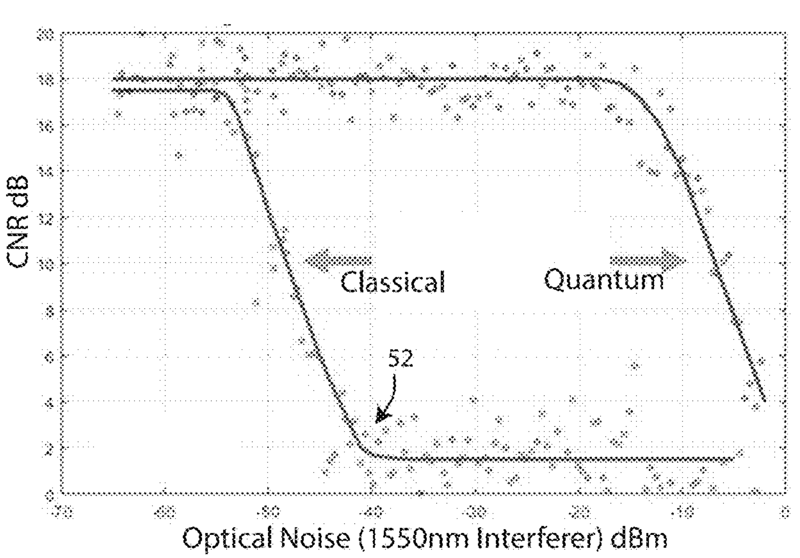
Fig. 3

QUANTUM OPTICAL COMMUNICATIONS RECEIVER

TECHNICAL FIELD

The disclosure relates generally to quantum communications and more particularly to a quantum optical, phase sensitive receiver.

BACKGROUND

This section provides background information related to the present disclosure which is not necessarily prior art.

Traditional classical optical communications systems can be susceptible to interference and eavesdropping. Thus there is a need for new technologies to implement better covert and secure communications.

SUMMARY

According to one aspect of the disclosure the quantum optical communications receiver employs a non-linear waveguide formed of a nonlinear material and having at least one reflective interface disposed proximate a first end of the waveguide. A pump is coupled to inject pump photons at a first wavelength associated with a first energy into the first end of the waveguide.

A coupling mechanism is configured to receive an incoming signal and communicate the incoming signal to a second end of the waveguide, the incoming signal comprising injected quantum entangled signal and idler photons.

The nonlinear waveguide performs optical parametric amplification upon the incoming optical signal in a quantum photonic process that generates additional signal and idler photons to thereby boost the intensity of the incoming signal through classical wave interference.

The injected quantum entangled photons interact with the pump photons to create phase conjugate photons, and wherein the summation of respective electric fields of the pump photons and the phase conjugate photons produce an amplitude modulated signal and idler pair.

A photodetector communicates with the coupling mechanism and operates to convert the amplitude modulated signal and idler pair into an electrical signal defining the output of the communications receiver.

According to another aspect of the disclosure, the quantum optical communications receiver employs a waveguide formed of a nonlinear crystal and a reflective interface disposed proximate a first end of the waveguide. In one embodiment both ends of the waveguide have reflective coatings. The first is transmissive at wavelength 1 (pump) and reflective at wavelengths 2 and 3 (signal and idler). The second facet is reflective at wavelength 1 (pump) and transmissive at wavelengths 2 and 3 (signal and idler). A pump is coupled to inject photons at a first wavelength associated with a first energy into the first end of the waveguide. Entangled photons are produced by the interaction of the pump and the non-linear optical medium. A circulator having first, second and third ports, is configured as follows:

The first port is configured to receive an incoming signal and communicate the incoming signal to the second port, the incoming signal comprising signal and idler photons at second and third wavelengths each associated with energies lower than the first energy, The second port is coupled to a second end of the waveguide and operative to communicate the incoming optical signal into the waveguide in a propagating direction such that the incoming signal propagates through the non-linear waveguide in a first direction towards the first end of the waveguide, reflects from the reflective interface and idler pair which propagates back through the nonlinear waveguide in a second direction towards the second end of the waveguide, whereupon the reflected signal enters the second port. Amplitude modulation is produced by the interaction of the signal plus idler plus pump photons in the non-linear optical medium that leads to amplification or deamplification, depending on the relative phase difference of all signals.

The third port is configured to receive the amplitude modulated signal and idler pair entering from the second port.

The circulator is employed in a double pass orientation. In an alternate embodiment a single pass orientation may be implemented using integrated wavelength division multiplexers.

A photodetector is coupled for communication with the third port and operative to convert the amplitude modulated signal and idler pair into an electrical signal defining the output of the communications receiver. In one embodiment an optical filter may be used. The system can be operated with direct detection of the signal and idler wavelength, or through detection of only one. This is useful for channelization.

BRIEF DESCRIPTION OF THE DRAWINGS

The drawings described herein are for illustrative purposes only of selected embodiments and not all possible implementations. The particular choice of drawings is not intended to limit the scope of the present disclosure.

FIG. 1 is a block diagram of the quantum optical communications receiver;

FIG. 2 is a block diagram illustrating a non-linear interaction in use as an optical parametric amplifier;

FIG. 3 is a graph comparing the carrier to noise ratio (CNR) of a classical receiver operating at an equivalent transmit power to the disclosed quantum receiver.

DETAILED DESCRIPTION

Referring to FIG. 1, the quantum optical communications receiver is shown generally at 10. The receiver input is identified on the right-hand side at 22. A pump laser source 12 provides optical power used to develop amplification of optical signals supplied to the receiver input 22, as will be described more fully below. In the illustrated embodiment a pump laser source developing optical power at a nominal 775 nm wavelength may be used. Pump laser sources of other wavelengths may also be used.

The pump laser source 12 produces a stream of photons (775 nm nominally) which are fed through a polarization controller 14. The polarization controller ensures the photons are aligned to the orientation providing the maximum non-linear interaction of the non-linear waveguide medium.

The stream of photons is then fed from the polarization controller 14 through a First filter 16, which functions as a 775 nm isolator, to prevent reflected light from returning to the laser.

Optical Parametric Amplifier

The filtered stream of pump photons is then fed to a waveguide structure configured as a dual pass parametric amplifier 20 (DP-OPA). The waveguide structure is formed of a suitable material, such as Lithium Niobate crystal, to support the optical parametric amplification process. The physics of this optical parametric amplification process is discussed below. In general terms, the pump photons are supplied to the pump side input 18 of the optical parametric amplifier 20, while the signal to be amplified is supplied to the signal side input or facet 21. A reflective interface 23 is provided within the optical parametric amplifier, adjacent the pump side input 18. The second interface (side 21) also has a reflective coating. The first facet 18 is transmissive at a first wavelength (pump) and reflective at second and third wavelengths corresponding to the signal and idler. The second facet 23 is reflective at the first wavelength (pump) and transmissive at the second and third wavelengths (signal and idler).

Signal photons fed into the signal side input 21 traverse the full length of the optical parametric amplifier (from right to left in FIG. 1), then reflect from the reflective interface 23 and traverse the full length of the optical parametric amplifier again (from left to right in FIG. 1) before exiting at the signal side input 21. Thus the illustrated optical parametric amplifier is a double pass device.

Optical Receiver Input and Output

With reference to the quantum optical receiver 10, its receiver input 22 is where the incoming signal, comprising quantum entangled photon pairs, is introduced for processing and decoding. The photons are entangled in time and energy, with a total energy adding up to the pump photon energy. One photon of each entangled pair is designated as the signal photon; the other of each entangled pair is designated as the idler photon. At this point in the discussion these terms can be considered as labels, useful in distinguishing one from the other. However, as discussed below, these signal and idler photons play different roles in the optical parametric amplification process.

These quantum entangled photon pairs are at lower energy than the pump photons. Specifically, the entangled photon pairs have wavelengths nominally twice the wavelength of the pump laser source. Thus in FIG. 1, these entangled photon pairs are indicated as having a 1550 nm wavelength. As noted, if a pump wavelength different than 775 nm is used, then these entangled photon pairs would be twice that different pump wavelength. In practice, the pump wavelength will be selected to be nominally half the wavelength of the photons received at input 22.

The signal and idler pairs are fed from the receiver input 22, through a polarization controller 24, which functions essentially the same as the polarization controller 14. Thereafter, the signal and idler pairs are fed through circulator 26, which in the illustrated embodiment is a three-port device designed such that photons entering at port 1 exit from port 2. Similarly, photons entering at port 2 exit from port 3. Thus by means of this circulator, the signal and idler photons introduced into the receiver input 22 are fed to the signal side input 21 of the optical parametric amplifier. The amplified signal and idler photons then exit through the signal side input 21 into port 2 and out through port 3 of circulator 26.

The exiting photon pairs from port 3 of circulator 26 are passed through second (1550 nm) filter 28, and then fed to the DWDM 30. Having been amplified, the exiting photons may be more easily read using a suitable photon detector, such as photodetector 32 in FIG. 1. In the illustrated embodiment a dense wavelength division multiplexer (DWDM) 30 is inserted between second filter 28 and photodetector 32. This component is used to exploit received channelized signals, a topic which is further discussed below. The DWDM 30 can be eliminated in a single channel embodiment.

The exiting photons (comprising plural signal and idler pairs) collectively define what amounts to an amplitude modulated classical signal which the photon detector can measure. The amplitude modulation occurs due to the phase relationship between the pump photon stream and the incoming signal/idler streams. Specifically, the phase relationship between the receiver pump photon stream and the incoming signal/idler streams dictates the amplitude of the output photon streams, providing amplification or deamplification of the exiting photon streams that ultimately reach the photodetector.

Channelized Signals

In a multi-channel embodiment the quantum entangled signal and idler pairs arriving at the receiver input 22 will have different nominal wavelengths, each wavelength corresponding to a separate information channel. This information encoding technique is referred to as channelization. These channels may have been encoded at the source to carry different messages, or they may have been encoded at the source to carry the same message. The former supports a higher information bandwidth. The later is used to increase signal power for improving signal to noise ratio.

In the alternative, if the channelized streams each carry different messages, a separate optical parametric amplifier and photodetector would be used for each channel.

Optical Parametric Amplifier In linear optical materials, the polarization induced by light propagating in the medium is proportional to the electric field. The electric field of a beam of photons propagating through a medium produces polarization by spatially deforming the charge distribution in the outer shell of electrons. The relationship between the polarization and the electric field is the susceptibility. The polarization of the charge distribution is opposed by a restoring force of each atom.

The first order susceptibility represents the linear response of the medium to the electric field.

$$P = \varepsilon_0 x_1 \cdot E$$

where the linear optical susceptibility $x_1$ and the corresponding linear dielectric constant $\varepsilon_1=\varepsilon_0(1+x_1)$ are field independent constants of the medium.

However, some materials, such as Lithium Niobate crystal, do not behave linearly when exposed to high intensity light as produced by lasers. When such materials are exposed to high intensity illumination, the susceptibility and dielectric constants cease to be linear and thus develop higher order non-linear terms. These nonlinear terms can be expressed by expanding into a Taylor series.

Of interest here is the second-order nonlinearity. When the second-order nonlinearity condition is present in the material, optical parametric amplification can occur. Optical parametric amplification involves the non-linear interaction of three electric fields with a frequency relationship of $$\omega_3 = \omega_1 + \omega_2$$

With reference to FIG. 2, the pump beam with frequency ω3 and a less intense signal beam at ω1 enter the non-linear crystal 50. The signal beam is amplified by energy transfer from the pump to the signal at the signal frequency. This requires creation of a third beam at frequency $\omega_2$ so that the total photon energy is conserved. The ray at $\omega_2$ is called the idler.

The parametric amplification process proceeds in this fashion so long as the pump photon supply remains undepleted. The parametric amplification process can be viewed as a repeated generation process in which interaction of the signal (idler) photons with the pump photons create a idler (signal) photon with a conjugate phase, referred to as the phase conjugate photon. The exiting photon stream can be considered as a summation of the electric fields for the injected and the phase conjugated photons. If the optical phases of the phase conjugate photons are in alignment, amplification is observed, while photons 180 degrees out of phase cause de-amplification. Thus the phase relationship can be translated into an amplitude modulation.

In the configuration illustrated in FIG. 1, both signal and idler photons (not merely the signal photons) are fed initially into the optical parametric amplifier 20 at input 21, where they exist inside the non-linear medium of optical parametric amplifier 20 for a dual pass transit through the medium. During this transit time, both of the introduced signal and idler photons participate in the amplification process.

Performance and Benefits

The performance of the quantum optical communications receiver can be seen in FIG. 3, which compares the detected carrier to noise ratio (CNR) of the quantum signal to a classical signal with equivalent photon flux (rate of photons transmitted). In the presence of optical noise interference at 1550 nm, the quantum signal has a much stronger signal than the classical signal. The classical signal drops to a very low level at 52 dBm, whereas the quantum signal remains high for much longer, illustrating that quantum signals can be detected in the presence of much greater optical noise than corresponding classical signals.

Useful in continuous variable (CV) quantum-optical (QO) communication channels, the receiver can be used in covert signal detection applications, where receipt of quantum entangled signals can be at or below the classical noise floor. Thus these quantum entangled signals will look like noise to an adversary.

The receiver enjoys improved signal to noise ratio (SNR). Thus it exhibits improved noise rejection and resistance to jamming. This makes the receiver useful as building blocks in a wide variety of different applications. These building blocks do not require quantum storage mechanisms, which can be costly and difficult to maintain.

In addition to covert and secure communications applications, the receiver is useful in implementing hybrid quantum-classical communications systems, and in a variety of sensing applications, such as sensing vibrations along the quantum channel and sensing Doppler shifts, for example.

In security applications, the receiver offers enhanced security. Use of entangled photons increases difficulty of adversaries deciphering intercepted signals and increases the ability to detect intruders.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment as contemplated herein. Various changes may be made in the function and arrangement of elements described in an exemplary embodiment

The invention claimed is:

1. A quantum optical communications receiver, comprising:

a non-linear waveguide formed of a nonlinear material and having at least one reflective interface disposed proximate a first end of the waveguide;

a pump coupled to inject pump photons at a first wavelength associated with a first energy into the first end of the waveguide;

a coupling mechanism configured to receive an incoming signal and communicate the incoming signal to a second end of the waveguide, the incoming signal comprising injected quantum entangled signal and idler photons;

the nonlinear waveguide performing optical parametric amplification upon the incoming optical signal in a quantum photonic process that generates additional signal and idler photons to thereby boost the intensity of the incoming signal through classical wave interference;

wherein the injected quantum entangled photons interact with the pump photons to create phase conjugate photons, and wherein the summation of respective electric fields of the pump photons and the phase conjugate photons produce an amplitude modulated signal and idler pair;

a photodetector coupled for communication with the coupling mechanism and operates to convert the amplitude modulated signal and idler pair into an electrical signal defining the output of the communications receiver.

2. The quantum optical communications receiver of claim 1 further comprising a first optical filter disposed between the pump and the first end of the waveguide, the first optical filter having a cutoff configured to substantially impede photons having wavelengths substantially different than the first wavelength.

3. The quantum optical communications receiver of claim 1 wherein the coupler mechanism is a circulator.

4. The quantum optical communications receiver of claim 1 further comprising a first polarization controller coupled to the pump and being operative to constrain the photons at the first wavelength to a common polarization.

5. The quantum optical communications receiver of claim 1 wherein the incoming signal comprises signal and idler photons traveling in a common stream; and wherein a wavelength division multiplexer device is inserted in a signal path between the third port and the photodetector and operates to separate the signal and idler photons from each other.

6. A quantum optical communications receiver, comprising:

a photon source producing pump photons at a first wavelength;

an optical parametric amplifier coupled to receive the pump photons;

a photodetector; and a three-port circulator having a first port receptive of an incoming optical signal comprising quantum entangled signal and idler photons of an energy lower than the pump photons, a second port coupled to the optical parametric amplifier, and a third port coupled to the photodetector;

wherein the optical parametric amplifier uses the pump photons to perform a quantum photonic process upon the incoming optical signal that generates additional signal and idler photons and thereby boosts the intensity of the incoming signal so that it can be more readily detected by the photodetector.

7. The quantum optical communications receiver of claim 6 wherein the photon source is a laser.

8. The quantum optical communications receiver of claim 6 wherein the optical parametric amplifier comprises a nonlinear medium.

9. The quantum optical communications receiver of claim 6 wherein the optical parametric amplifier comprises a nonlinear crystal.

10. The quantum optical communications receiver of claim 8 wherein the nonlinear medium comprises a Lithium Niobate crystal.

11. The quantum optical communications receiver of claim 6 wherein the optical parametric amplifier is configured as a double pass device.

12. The quantum optical communications receiver of claim 8 wherein the incoming signal comprises signal and idler photons traveling in a common stream; and wherein a wavelength division multiplexer device is inserted in a signal path between the third port and the photodetector and operates to separate the signal and idler photons from each other.

* * * * *